US010885189B2

(12) United States Patent
Jeffries et al.

(10) Patent No.: US 10,885,189 B2
(45) Date of Patent: Jan. 5, 2021

(54) ISOLATED CONTAINER EVENT MONITORING

(71) Applicant: Microsoft Technology Licensing, LLC, Redmond, WA (US)

(72) Inventors: Charles G. Jeffries, Sammamish, WA (US); Benjamin M. Schultz, Bellevue, WA (US); Giridhar Viswanathan, Redmond, WA (US); Frederick Justus Smith, Redmond, WA (US); David Guy Weston, Seattle, WA (US); Ankit Srivastava, Seattle, WA (US); Ling Tony Chen, Bellevue, WA (US); Hari R. Pulapaka, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 429 days.

(21) Appl. No.: 15/601,759

(22) Filed: May 22, 2017

(65) Prior Publication Data
US 2018/0336351 A1    Nov. 22, 2018

(51) Int. Cl.
*H04L 29/06* (2006.01)
*G06F 21/56* (2013.01)
(Continued)

(52) U.S. Cl.
CPC ............ *G06F 21/566* (2013.01); *G06F 21/53* (2013.01); *G06F 21/577* (2013.01);
(Continued)

(58) Field of Classification Search
CPC ...... G06F 21/566; G06F 21/577; G06F 21/53; G06F 2221/2101; G06F 2221/033; G06F 2221/034; H04L 63/101; H04L 63/0281
See application file for complete search history.

(56) References Cited

U.S. PATENT DOCUMENTS 8,205,257 B1    6/2012    Satish et al.
8,990,944 B1 *   3/2015    Singh ..................... G06F 21/56
                                                           726/24
(Continued)

FOREIGN PATENT DOCUMENTS

WO    WO-2015072004 A1 *   5/2015    .......... G06F 11/0793

OTHER PUBLICATIONS

Wang, et al., "Isolating commodity hosted hypervisors with HyperLock", In Proceedings of 7th ACM European conference on Computer Systems, Apr. 10, 2012, pp. 127-140.
(Continued)

*Primary Examiner* — Carl G Colin
*Assistant Examiner* — Hany S. Gadalla
(74) *Attorney, Agent, or Firm* — Fiala & Weaver P.L.L.C.

(57) ABSTRACT

A host operating system running on a computing device monitors resource access by an application running in a container that is isolated from the host operating system. In response to detecting resource access by the application, a security event is generated describing malicious activity that occurs from the accessing the resource. This security event is analyzed to determine a threat level of the malicious activity. If the threat level does not satisfy a threat level threshold, the host operating system allows the application to continue accessing resources and continues to monitor resource access. When the threat level satisfies the threat level threshold, the operating system takes corrective action to prevent the malicious activity from spreading beyond the isolated container. Through the use of security events, the host operating system is protected from even kernel-level attacks without using resources required to run anti-virus software in the isolated container.

20 Claims, 6 Drawing Sheets

(51) Int. Cl.
*G06F 21/57* (2013.01)
*G06F 21/53* (2013.01)

(52) U.S. Cl.
CPC ...... *H04L 63/101* (2013.01); *G06F 2221/033* (2013.01); *G06F 2221/034* (2013.01); *G06F 2221/2101* (2013.01); *H04L 63/0281* (2013.01)

(56) References Cited

U.S. PATENT DOCUMENTS

| | | | |
|---|---|---|---|
| 8,997,096 B1 | 3/2015 | Protopopov et al. | |
| 9,208,030 B1 | 12/2015 | Mooring et al. | |
| 9,355,247 B1 | 5/2016 | Thioux et al. | |
| 9,442,752 B1 | 9/2016 | Roth et al. | |
| 2005/0114672 A1* | 5/2005 | Duncan | G06F 21/10 713/182 |
| 2007/0106993 A1 | 5/2007 | Largman et al. | |
| 2009/0037682 A1 | 2/2009 | Armstrong et al. | |
| 2009/0125974 A1 | 5/2009 | Zhang et al. | |
| 2010/0017879 A1* | 1/2010 | Kuegler | G06F 21/123 726/23 |
| 2012/0072968 A1* | 3/2012 | Wysopal | G06F 11/3612 726/1 |
| 2012/0290878 A1* | 11/2012 | Gladwin | G06F 11/076 714/20 |
| 2013/0013953 A1* | 1/2013 | Eck | G06F 9/45545 714/2 |
| 2013/0191924 A1 | 7/2013 | Tedesco et al. | |
| 2013/0198764 A1* | 8/2013 | Kacin | G06F 9/45537 719/328 |
| 2013/0247133 A1* | 9/2013 | Price | G06F 21/577 726/1 |
| 2014/0137255 A1* | 5/2014 | Wang | G06F 21/566 726/24 |
| 2014/0317677 A1* | 10/2014 | Vaidya | H04L 63/20 726/1 |
| 2014/0337836 A1 | 11/2014 | Ismael | |
| 2015/0163088 A1 | 6/2015 | Anschutz | |
| 2015/0242629 A1* | 8/2015 | Lindo | G06F 21/53 726/1 |
| 2015/0324586 A1* | 11/2015 | Ghosh | G06F 21/566 726/23 |
| 2016/0134623 A1 | 5/2016 | Roth et al. | |
| 2016/0182540 A1* | 6/2016 | Ghosh | G06F 21/55 726/23 |
| 2016/0241573 A1* | 8/2016 | Mixer | H04L 63/1416 |
| 2017/0111374 A1 | 4/2017 | Harris et al. | |
| 2017/0322824 A1* | 11/2017 | Reuther | G06F 3/0604 |
| 2018/0027009 A1* | 1/2018 | Santos | H04L 63/1433 726/25 |
| 2018/0053001 A1* | 2/2018 | Folco | G06F 21/577 |
| 2018/0253551 A1* | 9/2018 | Chalmandrier-Perna | G06F 21/566 |
| 2018/0293374 A1* | 10/2018 | Chen | G06F 21/53 |
| 2018/0295036 A1* | 10/2018 | Krishnamurthy | H04L 41/0893 |
| 2019/0311132 A1* | 10/2019 | Arnoth | H04L 63/1416 |

OTHER PUBLICATIONS

"Bromium LAVA—Live Attack Visualization and Analytics", https://www.bromium.com.sites/default/files/ds-lava-us-en.pdf, Retrieved on: Dec. 22, 2016, pp. 1-2.
"International Search Report & Written Opinion Issued in PCT Application No. PCT/US2018/028979", dated Jul. 4, 2018, 10 Pages.

* cited by examiner

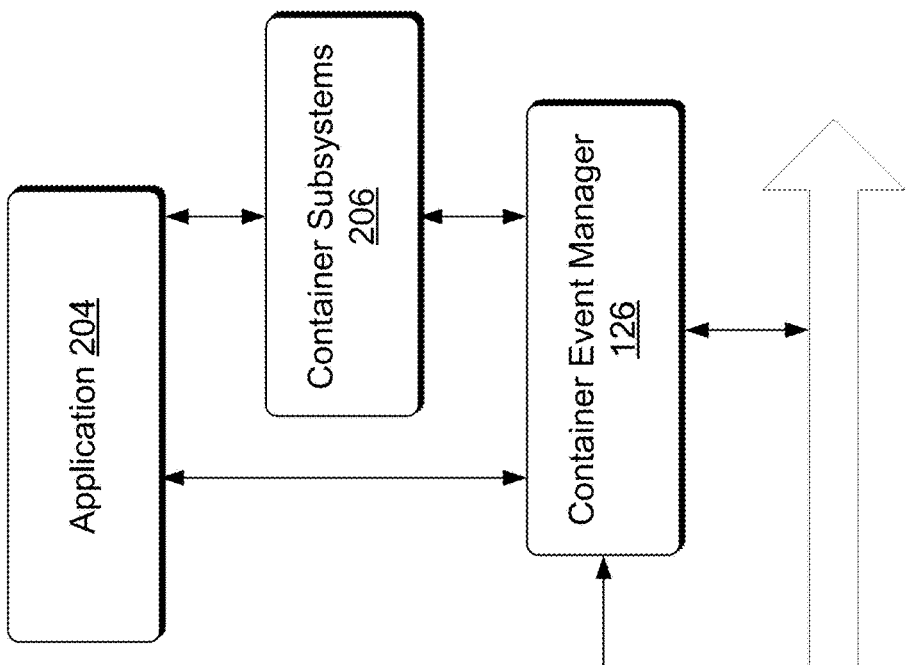
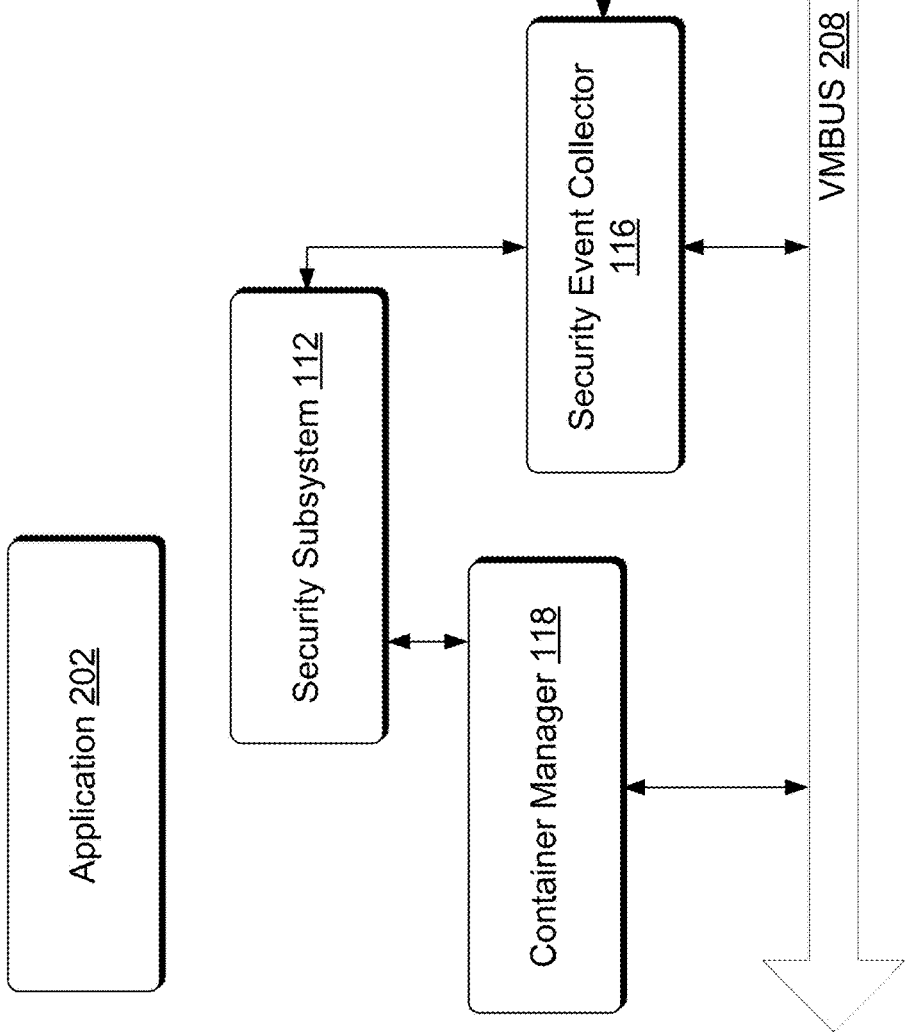
Fig. 2

500

Run An Application In A Container That Is Isolated From A Host Operating System 502

Monitor Container Activity While The Application Runs In The Container 504

Detect Access By The Application To A Resource 506

Generate A Security Event Describing Malicious Activity From The Application Accessing The Resource 508

Log The Generated Security Event 510

Analyze The Logged Security Event To Determine A Threat Level Of The Malicious Activity 512

Take Corrective Action To Mitigate The Malicious Activity When The Threat Level Satisfies A Threat Level Threshold 514

Fig. 5

ISOLATED CONTAINER EVENT MONITORING

BACKGROUND

Computing devices are frequently exposed to attacks from malicious software that can compromise functionality of information stored on the computing devices as well as the devices themselves. For example, malicious software can attempt to write illicit information to a computing device's operating system or access privileged memory locations. Often, malicious software does not include sufficient privileges to perform these operations, which results in system errors and system event messages. Identifying and protecting against these attacks is a continuing struggle, and failure to protect against such attacks can lead to user frustration with their computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an application running in a container that is isolated from a host operating system accesses a resource. In response to detecting that the application is accessing the resource, the host operating system monitors application activity in the container while the application is accessing the resource. In response to detecting potentially malicious activity in the container that occurs while the application is accessing the resource, the host operating system generates a security event that includes information describing the potentially malicious activity. The host operating system then analyzes the security event to determine a threat level associated with the potentially malicious activity.

In accordance with one or more aspects, a security event is received. The received security event includes information describing potentially malicious activity that results from an application accessing a resource in a container that is isolated from a host operating system. In response to receiving the security event, the host operating system determines that a threat level associated with the received security event satisfies a threat level threshold. In response to determining that the threat level associated with the received security event satisfies the threat level threshold, the host operating system takes corrective action to mitigate the potentially malicious activity in the container.

In accordance with one or more aspects, an application is running in a container that is isolated from a host operating system of a device. As discussed herein, an application running in the isolated container is configured to access one or more resources stored at the device implementing the container or stored remotely from the device implementing the container. In response to detecting that the application is accessing the resource, the device monitors application activity in the container while the application is accessing the resource. In response to detecting potentially malicious activity occurring in the container, the device generates a security event that includes information describing the potentially malicious activity. The device then analyzes the security event to determine a threat level associated with the potentially malicious activity. The device then determines whether the threat level satisfies a threat level threshold. In response to determining that that threat level associated with the generated security event satisfies the threat level threshold, the device takes corrective action to mitigate the potentially malicious activity in the container.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 illustrates an example system architecture for isolated container event monitoring in accordance with one or more embodiments.

FIG. 5 is a flowchart illustrating an example process for monitoring events in an isolated container in accordance with one or more embodiments.

DETAILED DESCRIPTION

Figure 1:
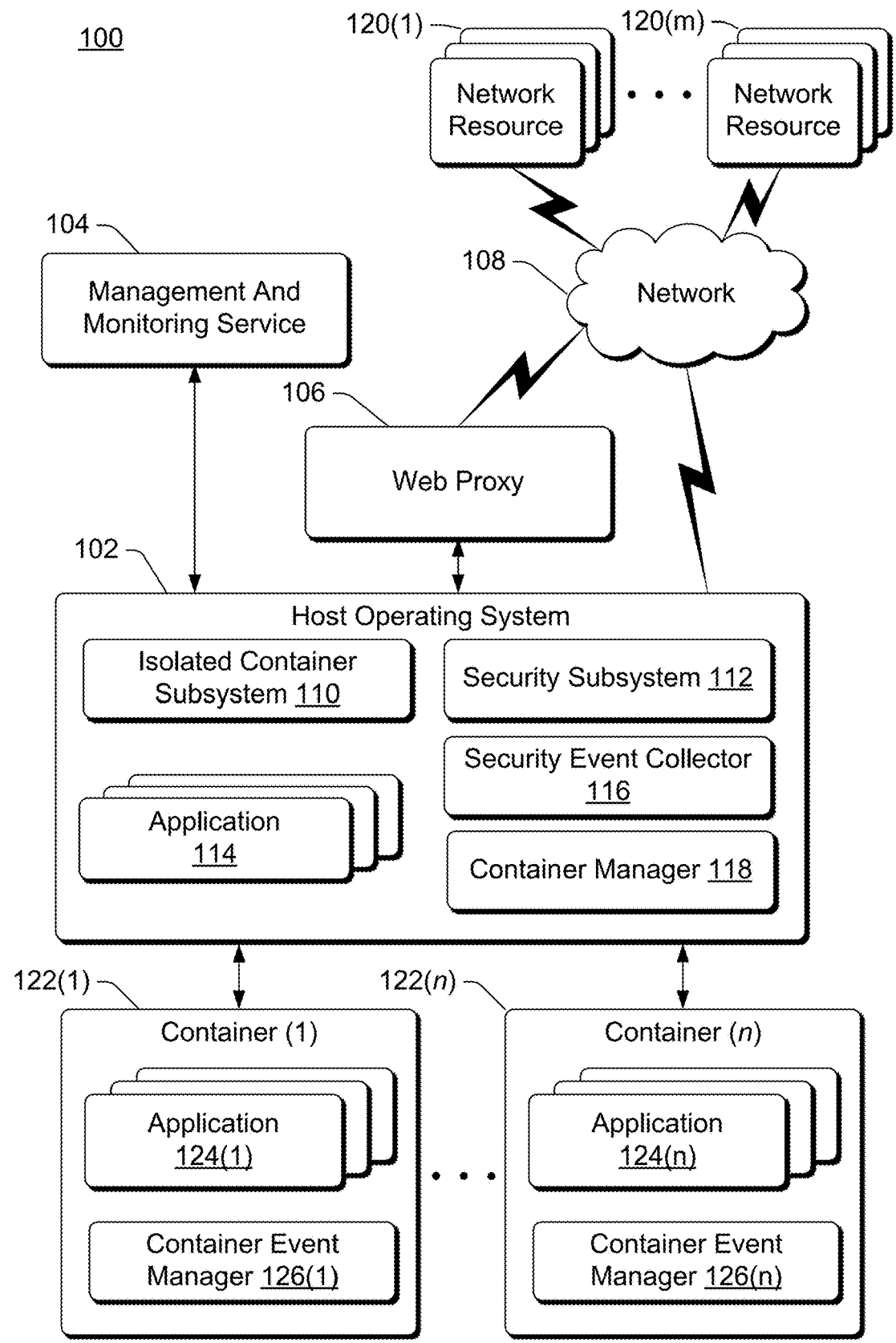
FIG. 1 illustrates an example system implementing isolated container event monitoring in accordance with one or more embodiments.

Event monitoring for isolated containers is discussed herein. An operating system running on a computing device, also referred to herein as a host operating system running on a host device, uses containers for resource partitioning. In contrast to many virtual machine-based or sandbox approaches, using containers in conjunction with the event monitoring techniques described herein protects the computing device from attacks by isolating web browsers, related applications, and operating system components such as the kernel, the file system, and the network from untrusted resources. In accordance with one or more embodiments, the host operating system treats every resource, whether local or network resources, as untrusted in an effort to protect the host operating system. In this manner, when the host device requests access to a resource, the host device contains the resource within one or more containers that provide full kernel isolation from the host operating system. As described herein, a resource refers to locations (e.g., of devices or where data resides) that the host device can access locally, access via a network, as well as one or more of data, executables, or network connections provided by different network locations.

In order to protect the computing device implementing the host operating system, the host operating system receives policy to define a list of acceptable container activity. In accordance with one or more embodiments, a list of acceptable container activity includes a "whitelist" that enumerates one or more activities that are considered to be acceptable within a container. Alternatively or additionally, a list of acceptable container activity is inferred from a "blacklist" that enumerates one or more container activities that are considered to satisfy a threat level threshold. For instance, a container policy blacklist may specify unauthorized changes made to a container registry, to a container configuration file, to a container file system, may specify unauthorized memory access or kernel activity in either the container or the host operating system, may specify unauthorized process creations or injections, may specify a range of normal network activity generated from historical analysis of monitored container activity, and so on. Alternatively or additionally, there may be other examples of policy including use patterns, or characteristics of usage such as a range of acceptable values (e.g., acceptable values for disk usage, memory usage, and so forth). Thus, the host operating system is made aware of acceptable threat level thresholds for various container activities that may occur when a resource is accessed within the container.

In an enterprise environment where multiple users of the enterprise are connected and share access to common enterprise data and/or networks, this policy may be defined by an administrator of the enterprise to ensure that individual users as well as the shared data and networks of the enterprise remain protected. Alternatively or additionally, in a cloud computing environment where multiple computing devices are connected and share access to common resources, this policy may be defined to protect all connected devices. In some embodiments, the policy is locally calculated based on applications that are currently installed on a computing device, as well as resources that are expected to be used by the installed applications. Expectations of resources that are to be used by certain applications can be determined in any manner. For example, expected resources to be used by an application can be user-specified, specified by an application developer, gleaned from historical application resource usage, and so on. In some embodiments, the policy is learned based on telemetry or other available existing usage statistics. Accordingly, the isolated container event monitoring techniques can be used to protect a wide range of computing devices as well as a single computing device implementing the host operating system.

When an application accesses a resource in a container, a container event manager implemented in the container monitors container activity that occurs from accessing the resource. The container event manager is configured to generate a security event in response to detecting malicious activity within the container occurring from resource access. In accordance with one or more embodiments, the host operating system considers every resource to be untrusted and forces resources to be accessed within an isolated container. Thus, the container event manager is configured to treat all container activity as malicious activity and constantly generate security events that describe container activity as it occurs in real-time.

As described herein, a security event includes information describing activity that results from an application accessing a resource in a container. Information describing container activity can include any category of details describing behavior of a container. For example, a security event can include information describing an accessed resource, information describing the application used to access the resource, information describing commands invoked by the application, information describing attempted communications by the application, and so forth.

Example information describing an accessed resource includes a resource name, a location from where the resource was accessed, and an identification of an individual or entity that created the resource. Similarly, example information describing the application used to access the resource includes a name of the application, a version number of the application, and a manufacturer of the application. Example information describing commands invoked by an application include a read or write request to a file system cache, a request to access a certain memory location, an instruction to terminate a running process, and so on. Example information describing attempted communications by the application include an identification of a network location that the application attempts to access, a description of the network location, a copy of data or code that the application attempted to communicate outside the container, and so on. Accordingly, the information included in a security event is useable to describe behavior of an application that accesses a resource while running in an isolated container.

The container event manager is configured to securely pass these security events to a security event collector of the host operating system for analysis. For example, a security event collector can collect security events from one or more containers in order to log security events describing container activity as it occurs in real-time. In some embodiments, the host operating system monitors container activity for host resource usage by the container. As described herein, host resources include any type of resource, such as computational resources, storage resources, network connectivity resources, and so on. Accordingly, the host operating system is configured to monitor container activity such as data exhaust, network connectivity, communications within the container, communications attempting to leave the container, and so on. Thus, the host operating system is configured to generate its own security events and transmit the generated security events to the security event collector. As such, the host operating system is able to monitor container activity when a container manager is non-accessible, non-responsive, not implemented, partially implemented, or otherwise inactive. Alternatively, when the container event manager is trusted, security events generated by the host operating system can be compared against security events generated by the container event manager to verify correct resource usage reporting for an isolated container.

In order to increase system security, the host operating system generally treats all data received from a container as malicious data. Thus, in order to preserve the integrity of information included in a security event, the host operating system implements a secure kernel in a communication channel communicatively coupling the host operating system with the isolated container. In embodiments, the secure kernel is configured to protect the host operating system by claiming data or code related to the security event collector or the host operating system as off-limit memory. Thus, when malicious software attempts to access off-limit memory, the secure kernel generates an exception or system interrupt that is included in the security event to be analyzed in determining a corresponding threat level. Accordingly, the security events described herein provide secure memory snapshots and kernel snapshots that describe activity occurring within a container. In some embodiments, a full or partial snapshot of the container can be used in forensic analysis to better understand aspects of an attack, a breach, and so forth.

The host operating system is configured to determine a threat level associated with each received security event. As described herein, a security event describes activity performed by an application, performed by an operating system, performed over a network, and so on. Thus, a security event as described herein includes information whether any component of a computing device is engaged in potentially malicious activity. For example, the host operating system compares information describing a received security event with policy in order to determine whether the security event describes malicious activity. The host operating system can log the security events in order to construct a repository of information describing container activity that can be leveraged to determine whether subsequent container activity is malicious to the point of satisfying a threat level threshold.

In some embodiments, a threat level for container activity is determined using two or more security events. In these embodiments, information from multiple security events is aggregated and analyzed to ascertain a current threat level. Accordingly, as additional security events are received, the additional security events are aggregated with logged security events to determine a current threat level for a container. In some embodiments, behavioral analytics are used to identify a threat level threshold based on an application in use or a user of the computing device. For example, a single user typically browses to a generally predictable set of websites and uses a generally predictable set of applications, with a minimal standard deviation of behaviors. Application behavior when accessing a resource is similarly predictable. Accordingly, if a user starts visiting numerous websites that the user has not previously visited, this behavior is logged as one or more security events and compared against a threat level threshold to determine whether corrective action is needed. Similarly, if an application begins downloading and installing software that the application has not previously downloaded and installed, this activity is logged in one or more security events and compared against a threat level threshold to determine whether corrective action is needed. In a distributed computing environment, monitoring container activity can be performed at the host operating system, in a different container that is isolated from the host operating system, at a different device than a device implementing the host operating system, at a central server connected to multiple devices, at a cloud service, and so on. Thus, the techniques described herein enable analysis of container activity at various locations without comprising the security of these various locations.

In response to determining that a threat level of malicious activity described by a received security event does not satisfy a threat level threshold, the host operating system permits an application running in the container to continue accessing resources. However, in response to determining that a threat level of malicious activity described by a received security event satisfies a threat level threshold, the host operating system takes corrective action to mitigate a negative effect of the malicious activity. For instance, the host operating system may quarantine the container to prevent the container from accessing any resources or data outside the container. Alternatively or additionally, the host operating system may identify a resource causing the malicious activity and add the identified resource to a list of untrusted resources so that other computing devices are aware of possible negative effects. Additionally or alternatively, the host operating system can use the techniques described herein to monitor and enforce poorly written applications. For example, in some cloud environments, hastily written applications may encounter bugs or design flaws that result in high, inefficient resource usage, unintentional privilege escalations, or writing data to inappropriate places such as system files, configuration files, and so on. By monitoring activity of these poorly written applications, the techniques described herein enable identification and labeling of these poorly written applications as malicious, enabling them to be efficiently terminated.

In this manner, the host operating system is made aware of all potentially malicious container activity as it occurs in real-time with sufficient visibility to identify malicious activity that satisfies a threat level threshold. From this visibility, the host operating system can take corrective action to protect both itself as well as other operating systems on different devices. Furthermore, in contrast to systems in which containers and virtual machines are used to isolate and contain malicious software, with anti-virus software running in the container or virtual machine, the techniques discussed herein alleviate device resource usage that results from multiple instances of anti-virus software running in a container or virtual machine. By alleviating such device resource usage the device performance can be improved, such as faster start times, lower memory usage, lower disk usage, and so forth.

Container Isolation System for Event Monitoring

FIG. 1 illustrates an example system 100 implementing isolated container event monitoring in accordance with one or more embodiments. System 100 is implemented at least in part by a host device. Any of a variety of different types of computing devices can be used to implement the system 100, such as a server computer, a desktop computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality (VR) glasses or headset, augmented reality (AR) headset or glasses), an entertainment device (e.g., an entertainment appliance, a set-top box communicatively coupled to a display device, a game console), an Internet of Things (IoT) device (e.g., objects or things with software, firmware, and/or hardware to allow communication with other devices), a television or other display device, an automotive computer, and so forth. Thus, the computing device implementing system 100 may range from a full resource device with substantial memory and processor resources (e.g., personal computers, game consoles) to a low-resource device with limited memory and/or processing resources (e.g., traditional set-top boxes, hand-held game consoles).

The system 100 includes a host operating system 102, a management and monitoring service 104, and a web proxy 106. The management and monitoring service 104 is representative of a service that provides one or more administrative policies for the computing device implementing the host operating system 102, as discussed herein. The web proxy 106 is representative of functionality that controls access to one or more network resources 120(1), . . . , 120(m) accessed remotely from the computing device implementing the host operating system 102. For example, in one or more embodiments web proxy 106 controls access to one or more resources accessed from network 108 by requiring authentication from host operating system 102 before granting access to the one or more resources. Alternatively, in one or more embodiments the computing device implementing host operating system 102 accesses network resources 120(1), . . . , 120(m) via network 108 independent of a web proxy. Network 108 represents functionality of a data network, such as the Internet, a local area network (LAN), a public telephone network, an intranet, other public and/or proprietary networks, combinations thereof, and so forth. As such, network resources 120(1), . . . , 120(m) accessed via network 108 may include web sites, web applications, emails, documents, and so on.

In one or more embodiments, the host operating system 102, management and monitoring service 104, and web proxy 106 are implemented as part of the same computing device. Alternatively, at least part of the management and monitoring service 104 and/or web proxy 106 can be implemented on a device that is separate and remote from the device implementing the host operating system 102. For example, in one or more embodiments the management and monitoring service 104 is implemented as a mobile device management (MDM) service located remotely from a computing device implementing host operating system 102. Alternatively or additionally, the management and monitoring service 104 may be implemented as a lightweight directory access protocol (LDAP) server located remotely from a computing device implementing host operating system 102. Similarly, the web proxy 106 may be implemented remotely from the device implementing the host operating system 102.

The management and monitoring service 104 is configured to provide (e.g., push) policy to the host operating system 102. In one or more embodiments, the management and monitoring service 104 is configured to push policy to the host operating system 102 at regular or irregular intervals, such as at system startup, daily, and so on. Alternatively, the management and monitoring service 104 may be configured to push policy to the host operating system 102 whenever there is an update to policy for the host operating system. Although reference is made herein to policy being pushed to the host operating system 102, management and monitoring service 104 is configured to provide policy to host operating system via any suitable data transmission methods (e.g., streaming). Alternatively, in one or more embodiments host operating system 102 is configured to obtain (e.g., pull) policy from the management and monitoring service 104. The management and monitoring service 104 has two roles. First, the management and monitoring service 104 receives an administrative configuration for individual network resources 120(1), . . . , 120(m) that are generally accessible to a user of the host operating system 102. In one or more embodiments, these network resources are associated with individual levels of trust. For example, an employer may define any network resource that is associated with the employer's website as having a high level of trust. Accordingly, policy for the host operating system 102 indicates that any network resources associated with the employer's website are trusted network resources.

Additionally, the administrative configuration policy provided by the management and monitoring service 104 can specify acceptable threat levels for various resource activity. In one or more embodiments, this policy provided by the management and monitoring service 104 specifies an acceptable threat level threshold for various activities that occur from accessing individual network resources 120(1), . . . , 120(m) in a container 122(1), . . . , 122(n). As described in further detail below, this policy can be provided to the security subsystem 112 in order to enable the security subsystem 112 to analyze a threat level associated with potentially malicious container activity and to determine whether the threat level satisfies a threat level threshold.

The second role of the management and monitoring service 104 is to receive feedback from the host operating system 102 regarding monitored activity associated with individual network resources and to compile that monitored information into a report for an administrator. This compiled report may be used by an administrator to update policy pertaining to trusted network resources or to update policy pertaining to threat levels for various resource activity for the host operating system 102. Additionally or alternatively, this compiled report may be propagated from the management and monitoring service 104 or the host operating system 102 to at least one different computing device or cloud service implemented remotely from a computing device implementing the host operating system 102. In this manner, feedback from event monitoring in an isolated container can be used by others to protect multiple devices, such as devices of an enterprise, devices connected via the cloud, and so on. In some embodiments, the management and monitoring service 104 is configured to perform its own analysis on feedback from the host operating system 102 regarding monitored resource activity, using the techniques described herein. The management and monitoring service 104 is thus configured to further monitor for malicious activity on the host operating system 102 or in any of containers 122(1), . . . , 122(n).

The management and monitoring service 104 may be configured to receive policy configuration data from an administrator of the device that implements the host operating system 102. As discussed herein, policy describes information pertaining to trusted network resources such as trusted websites, trusted network locations, trusted networks, and so on. Additionally or alternatively, policy describes acceptable threat levels for potentially malicious activity. When the management and monitoring service 104 receives policy from an administrator, the management and monitoring service 104 is configured to send a policy update to a target set of computing devices. The target set of computing devices to which the management and monitoring service 104 sends policy updates is defined by an administrator in accordance with one or more embodiments. For example, in an enterprise environment as discussed above, the management and monitoring service 104 is configured to send policy updates to each computing device associated with the enterprise. Each computing device that receives a policy update is configured to locally store the policy for use when attempting to access resources.

As discussed in further detail below, the computing device that implements host operating system 102 is configured to dynamically monitor activity associated with accessed network resources 120(1), . . . , 120(m) and to dynamically monitor activity with local resources, such as one or more resources stored locally on a computing device implementing host operating system 102. Monitored activity associated with network resources is received via the security event collector 116, analyzed via the security subsystem 112, and updated locally at the host operating system 102 and communicated back to the management and monitoring service 104. In this manner, the management and monitoring service 104 may be continuously updated to provide a user of the host operating system 102 with an accurate list of trusted network resources and an accurate list of threat level thresholds for various security events.

The host operating system 102 also includes an isolated container subsystem 110, a security subsystem 112, one or more applications 114, a security event collector 116, and a container manager 118. The host operating system 102 also manages one or more containers, illustrated as multiple (n) containers 122(1), . . . , 122(n).

The isolated container subsystem 110 is representative of functionality for calling network isolation query application programming interfaces (APIs) to determine if a requested resource is trusted. If the isolated container subsystem 110 determines that a requested resource is trusted, the isolated container subsystem 110 allows the requested resource to be accessed by the host operating system 102. Alternatively, if the isolated container subsystem 110 determines that a requested resource is not trusted, the isolated container subsystem 110 causes the host operating system 102 to activate one or more of containers 122(1), . . . , 122(n) and allow the one or more activated containers to access the untrusted network resource.

The security subsystem 112 is representative of functionality for analyzing information describing potentially malicious activity that occurs from accessing a resource in one or more of containers 122(1), . . . , 122(n) in order to determine a threat level associated with the potentially malicious activity. For example, the security subsystem 112 can receive security events from the security event collector 116 that describe container activity resulting from resource access in one or more of containers 122(1), . . . , 122(n). The security subsystem 112 compares a received security event against policy, such as policy received from management and monitoring service 104, to determine a threat level of the potentially malicious activity. For example, the security subsystem 112 can compare security event information describing the potentially malicious activity against a list of acceptable and/or unacceptable container behavior to determine whether a threat level associated with the malicious activity satisfies a threat level threshold. Functionality of the security subsystem 112 is described in further detail below.

Applications 114 include one or more applications that are executable by one or more processors of the computing device implementing the host operating system 102. For example, applications 114 may include a web browser application. Alternatively or additionally, applications 114 may include applications such as e-mail applications, word processing applications, spreadsheet applications, visual presentation applications, and the like.

The security event collector 116 is representative of functionality for collecting security events that are securely communicated from one or more of containers 122(1), . . . , 122(n). The security event collector 116 is configured to subscribe to one or more container event managers 126(1), . . . , 126(n) in order to be aware of all container activity occurring in the one or more containers 120(1), . . . , 120(n). For example, the security event collector 116 may "pull" security events from one or more container event managers 126(1), . . . , 126(n) or establish a connection for the one or more container event managers 126(1), . . . , 126(n) to "push" security events to the security event collector 116 as security events are generated. Upon receiving a security event, the security event collector 116 forwards the security event with information describing potentially malicious container activity for analysis, such as to security subsystem 112. Communication between the security event collector 116 and the one or more containers 122(1), . . . , 122(n) is protected through implementation of a secure kernel in a communication channel that couples the security event collector 116 with the one or more containers 122(1), . . . , 122(n). In this manner, the host operating system 102 is made aware of all potentially malicious activity occurring within one or more containers 122(1), . . . , 122(n) without compromising security of operating system data or hardware aspects of a device implementing the host operating system 102. Functionality of the security event collector 116 is described in greater detail below.

The host operating system 102 additionally includes a container manager 118. The container manager 118 manages the scheduling of containers 122(1), . . . , 122(n) in the system 100 and determines which containers 122(1), . . . , 122(n) are run on the host operating system 102 at what times. Container manager 118 is also responsible for activating one or more containers 122(1), . . . , 122(n) for an individual user of the system 100 and for ensuring that other users of the system 100 cannot access the one or more containers 122(1), . . . , 122(n) created for the individual user. Depending on the number of physical processors and/or processor cores in the computing device running the host operating system 102, a single container 122(1), . . . , 122(n) can be run at a time (e.g., in the case of a single processor with a single core) or alternatively multiple containers 122(1), . . . , 122(n) can be run concurrently (e.g., in the case of multiple processors and/or multiple processor cores). Additionally, in one or more embodiments container manager 118 is configured to monitor user configuration changes that are performed within one or more of containers 122(1), . . . , 122(n). For example, container manager 118 is configured to detect changes to user preferences associated with a web site accessed in one of containers 122(1), . . . , 122(n). Host operating system 102 is configured to use these detected changes in the container and apply them to one or more related resources that are accessed in the host operating system.

Each container 122(1), . . . , 122(n) can be implemented in different manners. One type of container that a container 122 can be implemented as is referred to as a process container. For a process container, the application processes within the container run as if they were operating on their own individual system (e.g., computing device), which is accomplished using namespace isolation. Host operation system 102 implements namespace isolation. Namespace isolation provides processes in a container a composed view consisting of the shared parts of host operating system 102 and the isolated parts of the operating system that are specific to each container such as filesystem, configuration, network, and so forth. As described herein, isolated parts of the operating system that are specific to each container may also be referred to as container subsystems, which are discussed in further detail below.

Another type of container that a container 122 can be implemented as is referred to as a virtualized container. For a virtualized container, the virtualized container is run in a lightweight virtual machine that, rather than having specific host physical memory assigned to the virtual machine, has virtual address backed memory pages. Thus, the memory pages assigned to the virtual machine can be swapped out to a page file. The use of a lightweight virtual machine provides additional security and isolation between processes running in a container. Thus, whereas process containers use process isolation or silo-based process isolation to achieve their containment, virtualized containers use virtual machine based protection to achieve a higher level of isolation beyond what a normal process boundary can provide. A container may also be run in a virtual machine using physical memory.

In one or more embodiments, each container 122(1), . . . , 122(n) includes one or more applications 124(1), . . . , 124(n). Individual ones of the one or more applications 124(1), . . . , 124(n) correspond to instances of individual ones of the applications 114 on host operating system 102. Applications 124(1), . . . , 124(n) are thus useable to access untrusted resources in one or more of containers 122(1), . . . , 122(n) in a similar manner to how one of applications 114 would access a trusted resource on the host operating system 102.

In one or more embodiments, each container 122(1), . . . , 122(n) includes a container event manager 126(1), . . . , 126(n). Each container event manager 126(1), . . . , 126(n) is configured to monitor activity that occurs within a container 122(1), ..., 122(n). For example, each container event manager 126(1), ..., 126(n) is configured to monitor activity that occurs when one or more applications 124(1), ..., 124(n) access a resource within a respective container. Each container event manager 126(1), ..., 126(n) is additionally configured to generate a security event in response to detecting malicious activity within a container 122(1), ..., 122(n). As described herein, a security event includes information describing container activity that can be analyzed in order to determine whether malicious activity occurring within a container satisfies a threat level threshold. For example, a security event generated by a container event manager 126(1), ..., 126(n) can be securely transferred to the security event collector 116 and to the security subsystem 112 in order for the security subsystem 112 to compare information in the security event against security policy for the management and monitoring service. As is described in further detail below, a determination of whether potentially malicious activity indicated by the security event satisfies a threat level threshold is used by the container manager 118 to either allow an application 124(1), ..., 124(n) to continue accessing resources or take corrective action to mitigate the malicious activity.

Having considered an example system for implementing isolated container event monitoring, consider now an example architecture for the system implementing isolated container event monitoring in accordance with one or more embodiments.

System Architecture

FIG. 2 illustrates an example system architecture 200 for isolated container event monitoring in accordance with one or more embodiments. System architecture 200 is implemented at least in part by a computing device. Any of a variety of different types of computing devices can be used to implement the system architecture 200, analogous to the discussion above regarding types of that can be used to implement the system 100 of FIG. 1.

In the illustrated example, the computing device implementing the system architecture 200 includes two separate and isolated portions: the host operating system 102 and the container 122. Although illustrated as only including a single container 122, the system architecture 200 is configured to include any number of different containers 122. The host operating system 102 is isolated from any one or more containers 122 to protect the host operating system 102 from attacks or infections that may result from untrusted network resources, as illustrated by the dashed line in FIG. 2.

The host operating system 102 is illustrated as including security subsystem 112, security event collector 116, and container manager 118. Additionally, the host operating system 102 includes application 202, which may be one of applications 114 illustrated in FIG. 1.

The container 120 includes application 204, which is representative of an instance of application 202 included in host operating system 102. The container 122 additionally includes container subsystems 206, the functionality of which is discussed in further detail below. Additionally, the container 130 includes a container event manager 126, which is representative of functionality to monitor container activity and to generate a security event describing activity within the container 122, such as activity that occurs when the application 204 accesses a resource. Functionality of the container event manager 126 is discussed in further detail below.

The host operating system 102 and the container 122, although isolated from one another, are communicatively connected via virtual machine bus (VMBUS) 208. Virtual machine bus 208 is a communication channel that allows the host and container portions to communicate with one another. Additionally or alternatively, the host operating system 102 and the container 122 are communicatively connected via other means such as a physical network, a virtual network, simple message block (SMB) protocol, or remote procedure call (RPC) interconnections. The communicative connection between the host operating system 102 and the container 122 implements a secure kernel to maintain integrity of information passed from the container 122 to the host operating system 102. For example, in one or more embodiments the VMBUS 208 implements a secure kernel that specifies any data or memory locations associated with the container event manager 126, the security event collector 116, the container manager 118, or any other component of host operating system 102 as off-limits. Accordingly, when malicious software attempts to access off-limit data or memory locations, the secure kernel causes an exception or interrupt to occur, which is monitored by the container event manager 126 and included in a security event passed to the security event collector for determining a threat level associated with the off-limit access attempt.

Having considered a system architecture for a system implementing isolated container event monitoring, consider now functionality of individual components illustrated in the host portion and the container portion of system architecture 200.

Security Subsystem

Security subsystem 112 is representative of functionality for analyzing information included in security events describing potentially malicious activity that occurs from application 204 running in container 120. In order to implement isolated container event monitoring, security subsystem 112 is configured to communicate with the security event collector 116 and the container manager 118. In one or more embodiments, security subsystem 112 is automatically launched upon startup of the computing device implementing system architecture 200. Alternatively, security subsystem 112 is launched at other times, such as by the host operating system 102 upon creation of the container 122.

When security subsystem 112 is launched, it establishes a connection with security event collector 116 to receive security events passed from the container event manager 126. At launch, security subsystem 112 is additionally configured to establish a connection with a service, such as management and monitoring service 104 of FIG. 1, to receive updated policy information describing threat level thresholds for various container activities. In this manner, security subsystem 112 includes current information describing acceptable threat level thresholds for potentially malicious container activity.

Upon receiving a security event from the security event collector 116, the security subsystem 112 determines a threat level of malicious activity associated with the security event by comparing information included in the security event against policy. In accordance with one or more embodiments, policy is configured as a whitelist of information describing acceptable container activity. Alternatively or additionally, policy is configured as a blacklist of information describing prohibited network activity. In accordance with one or more embodiments, policy received by security subsystem 112 is formed from previously analyzed security events that describe a range of normal network activity resulting from container operations. For example, normal network activity as described herein includes information describing application 204's access to one or more known trusted resources.

Thus, by monitoring container activity with resources that are known to be trusted, policy can be generated to account for unknown malicious activity that falls outside a range of normal network activity. As described herein, normal network activity includes any activity between the container 122 and an isolated location, such as a different container, host operating system 102, a different computing device, and so on. As such, the security subsystem 112 is configured to determine a threat level of a potentially malicious activity by comparing information included in the form of security events against policy describing acceptable threat level thresholds for potentially malicious activity. Additionally, the security subsystem 112 is configured to analyze security events to learn malicious patterns over time. Patterns of logged security events can be analyzed to identify certain patterns that repeatedly generate a threat level that satisfies a given threat level threshold. For example if a pattern of security events describing application 204's access to a specific website repeatedly results in satisfying a threat level threshold, security subsystem 112 can learn that the specific website is not to be trusted. As the security subsystem 112 identifies malicious patterns of security events, the security subsystem 112 is configured to update policy describing potentially malicious activity, such as policy local to host operating system 104 or remote policy stored at the management and monitoring service 104 of FIG. 1.

In response to determining a threat level of a potentially malicious activity occurring in container 122, security subsystem interacts with container manage 118 to control the container 122. For example, in response to determining that a threat level associated with the malicious activity does not satisfy a threat level threshold for a particular security event, security subsystem 112 permits the application 204 to continue accessing one or more resources without intervention. However, in response to determining that a threat level associated with the malicious activity satisfies a threat level for a particular security event, security subsystem 112 causes the container manager 118 to take corrective action to mitigate the malicious activity. Functionality of the container manager 118 and corrective action is described in further detail below.

Although security subsystem 112 is illustrated as implemented by host operating system 102, security subsystem 112 is configured to perform the functionality described herein at a myriad of locations. For instance, security subsystem 112 can be implemented in a container that is isolated from both the host operating system 102 as well as the container 122. Alternatively or additionally, the security subsystem 112 can be implemented by an operating system of a device that is implemented remotely from a device implementing host operating system 102. Alternatively or additionally, the security subsystem 112 can be implemented as a cloud-based service in a distributed computing environment, as described in further detail with respect to FIG. 6. Accordingly, because security subsystem 112 can be implemented at a variety of locations, security subsystem 112 is configured to determine whether malicious container activity satisfies a threat level threshold simultaneously for multiple containers and multiple devices implementing the isolated container event monitoring techniques described herein.

In order to receive security events that include information describing potentially malicious container activity, security subsystem 112 employs a security event collector, such as security event collector 116.

Security Event Collector

Security event collector 116 is representative of functionality for implementing isolated container event monitoring in the computing device implementing system architecture 200. In order to implement the event monitoring, security event collector 116 is configured to communicate with the container event manager 126 in a secure manner via the virtual machine bus 208. In one or more embodiments, security event collector 116 is automatically launched upon startup of the computing device implementing system architecture 200. Alternatively, security event collector 116 is launched upon creation of the container 122.

Although system architecture 200 is illustrated as only including a single container 122, security event collector 116 is configured to subscribe to different container event managers implemented in different containers. Upon establishing a connection with container event manager 126, the security event collector 116 subscribes to security events published by the container event manager 126. For example, the security event collector 116 may "pull" security events from container event manager 126. Alternatively or additionally, the security event collector 116 may receive security events from the container event manager 126 as they are pushed by the container event manager 126.

Upon receiving a security event, the security event collector forwards the security event with information describing potentially malicious container activity for analysis, such as to security subsystem 112. In accordance with one or more embodiments, security event collector 116 forwards the security event anonymously to the security subsystem 112. This anonymous forwarding is useful in implementations where the security event collector 116 and the security subsystem 112 are implemented on different devices, or where the security subsystem 112 is implemented as a cloud-based service.

This security event information received from the security event collector 116 is then useable by the security subsystem 112 to instruct a container manager, such as container manager 118, how to manage the container 122.

Container Manager

Container manager 118 is responsible for activating one or more containers 122 that are isolated from host operating system 102 to access resources and to take corrective action in response to determining that malicious activity resulting from resource access satisfies a threat level threshold. As discussed herein, activating a container such as container 122 includes creating one or more new containers or resuming running of one or more suspended containers. Container manager 118 is additionally configured to activate one or more containers for an individual user logged into host operating system 102 and ensure that any other users of the host operating system are restricted from accessing the activated one or more containers for the individual user. Container manager 118 ensures a mapping of the user logged into host operating system 102 to the container 122. In some embodiments in which there are multiple users of host operating system 102 and multiple containers, the container manager 118 is configured to see a logged-on user's identity and directly associate that with one or more corresponding containers. This restriction prevents other users from viewing or otherwise interacting with the containers and further prevents the spread of potentially malicious container activity.

When host operating system 102 starts up, container manager 118 determines whether policy is present. In one or more embodiments, container manager 118 determines whether policy is present by communicating with security subsystem 112, as discussed herein. If container manager 118 determines that policy is present on host operating system 102, container manager 118 is configured to activate container 122 to handle any resources that are requested by the host operating system 102. Container manager 118 is configured to activate container 122 by communicating with host operating system 102 to determine if a container base image exists. If container manager 118 determines that a container base image does not exist, container manager 118 is configured to create a container base image. If container manager 118 determines that a container base image does exist, or after container manager 118 creates a container base image, container manager 118 waits for a user to log onto host operating system 102.

A container base image contains information required to create and activate an isolated container that includes its own operating system, such as container 122. For example, in one or more embodiments a container base image contains information describing how host operating system 102 is to set registry settings for a container. Information regarding registry settings is required because some applications that are opened inside container 122 behave differently than a version of the application that would be opened on host operating system 102. Additionally or alternatively, a container base image includes information describing how to create a user account within an application executed in container 122. Additionally or alternatively, the container base image includes information regarding an amount of allocated resources that may be required by container subsystems 206, such as memory, processors, disks, or networks, when container 122 is active.

When a user logs onto host operating system 102, container manager 118 determines whether a container corresponding to the container base image exists. If container manager 118 determines that a container does not exist for the container base image, container manager 118 may create a container, such as container 122. In this manner, container manager 118 ensures that a container base image includes any updated host operating system binaries, thereby keeping containers created from the container base image up to date with the host operating system 102. In the event of a host operating system 102 update, container manager 118 is configured to either force close any open containers or wait until user activity in the container has ceased to delete the container base image and create a new container base image. In a scenario where a container is hosted on a different computing device, container manager 118 is configured to communicate with the different computing device to manage and monitor the remote containers.

In response to determining that host operating system 102 is requesting access to one or more resources, container manager 118 is configured to identify an application on the host operating system that is requesting the untrusted network resource. Container manager 118 is configured to launch a version of the application, such as application 204, within container 122 to handle the requested resource. After container manager 118 activates a version of the application within container 122, container manager 118 is configured to remote into container 122 to display an interface of the application at a display of the device implementing host operating system 102.

Container manager 118 is configured to communicate with the isolated container subsystem 110 of FIG. 1 to ensure that appropriate hardware virtualization technology exists on host operating system 102, and in container 122, if the container is hosted by a remote computing device. For container manager 118 to function properly, the container manager 118 is configured to verify that host operating system 102's application programming interfaces (APIs) are available to manage isolated container lifecycles and associated network stacks.

In addition to creating container 122, container manager 118 is configured to take corrective action in response to receiving an indication from the security subsystem 112 that a threat level of malicious activity within the container 122 satisfies a threat level threshold. For example, container manager 118 is configured to quarantine the accessed resource associated with the malicious activity in order to prevent the resource from executing. Alternatively or additionally, container manager 118 is configured to identify the accessed resource associated with the malicious activity, add the identified resource to a blacklist enumerating malicious resources, and propagate the blacklist to other connected computing devices. For example, if a device implementing system architecture 200 is a central server of an enterprise, container manager 118 is configured to broadcast the blacklist to all connected devices in the enterprise to mitigate effects of the malicious activity. Because security event collector 116 is configured to receive security events from container event manager 126 in real-time as the application 204 is running, the container manager can broadcast blacklists in real-time to effectively prevent the spread of malicious activity.

Alternatively or additionally, in response to receiving an indication from the security subsystem 112 that a threat level of malicious activity within the container 122 satisfies a threat level threshold, container manager 118 is configured to quarantine the container 122 and prevent the container 122 from further accessing resources. By blocking the container 122 from further accessing resources, the container manager 118 prevents malicious activity occurring in the container from gaining file system access, access to shared resources hosted by the device implementing system architecture 200, and shared network resources, such as network resources 120(1), . . . , 120(m) of FIG. 1. Additionally or alternatively, the container manager 118 is configured to take corrective action in response to determining that malicious activity satisfies a threat level threshold by terminating the container 122 and rebuilding a new container. For example, the container manager 118 is configured to rebuild a new container that is free of both unwanted resources associated with the malicious activity, as well as any changes that may have occurred in the terminated container 122 as a result of the malicious activity.

Having considered a system architecture for a system implementing isolated container event monitoring, consider now functionality of a container event manager for monitoring resource access in the container portion of system architecture 200.

Container Event Manager

As discussed herein, container event manager 126 is representative of functionality for detecting access to a resource by a virtual application running in a container, such as application 204 running in container 122. Additionally, container event manager 126 is representative of functionality for monitoring activity in the container while the application is accessing the resource and for generating a security event including information describing potentially malicious activity when the container event manager 126 determines container activity to be potentially malicious.

In accordance with one or more embodiments, a device implementing system architecture 200 assumes that every resource accessed in the container 120 is associated with potentially malicious activity. Thus, the container event manager 126 is configured to constantly generate security events during resource access by the application 204. Each security event generated by container event manager 126 includes information describing container activity and, based on the constant nature of generating security events, provides a real-time overview of container activity to an external entity, such as security event collector 116.

The container event manager 126 is configured to monitor both activity in the container 122 as well as activity in the host operating system 102, via its connection to the host operating system 102 though virtual machine bus 208. For instance, when monitoring container activity, container event manager 126 may monitor access, changes, or activity in container subsystems 206. Container subsystems 206 are representative of instances of systems activated upon creation of the container 122 in order for the application 204 to operate in a similar manner as application 202 operates on host operating system 102. For example, container subsystems 206 can include a container registry, container configuration files, a container process manager, a container file system cache, a container memory manager, and so on.

In accordance with one or more embodiments, the container event manager 126 is configured to constantly monitor the container subsystems 206 in order to identify anomalous behavior that may occur due to malicious activity. For example, the container event manager 126 is configured to generate a security event upon identifying anomalous behavior that would otherwise not occur during normal container activity. Anomalous behavior can include, unauthorized changes to the container registry, unauthorized changes to the container configuration files, unauthorized changes to the container file systems, creation or injection of an unauthorized process into container activity, unauthorized memory access, unauthorized kernel activity, abnormal network activity, and so on.

As discussed herein, because the security subsystem 112 of the host operating system 102 is updated with policy describing acceptable threat level thresholds for various types of container activity, container event manager 126 does not need to be aware of policy describing what types of access are authorized or unauthorized. Accordingly, container event manager 126 regards all container activity as potentially malicious and generates security events that include information describing all container activity. Alternatively or additionally, policy from the security subsystem 112 can be communicated to the container event manager 126 to make the container event manager 126 aware of what container activity is regarded as potentially malicious activity.

The container event manager 126 is configured to securely communicate security events to the security event collector 116 of the host operating system using a secure kernel in a communication channel that couples the host operating system 102 with the isolated container 122, such as in virtual machine bus 208. By implementing this secure kernel in the communication channel, container event manager 126 is additionally configured to monitor activity in the host operating system 102 that may be attempted by malicious activity occurring in the container 122. For example, when application 204 accesses a malicious resource, the malicious resource may attempt to access a network, such as network 108 of FIG. 1, through the host operating system 102.

Because this access is prohibited by the secure kernel of the communication channel, the secure kernel causes an exception or interrupt to be generated, which is detectable by the container event manager 126. As such, the container event manager 126 is configured to monitor access to both shared resources hosted by a device implementing system architecture 200 as well as network resources that are located remotely from the device implementing system architecture 200. Using the techniques described herein, the container event manager 126 is configured to monitor potentially malicious activity in both an isolated container as well as a host operating system of a device running the isolated container. By aggregating information describing potentially malicious activities in both the host operating system 102 and the container 122, the container event manager 126 is configured to provide comprehensive information to the security event collector 116 that can be used by the security subsystem 112 to analyze malicious activity and take corrective action in real time to mitigate the malicious activity.

Having considered a system architecture for a system implementing isolated container event monitoring to protect one or more computing devices from attacks or infections associated with malicious resources, consider now example procedures in accordance with one or more embodiments.

Example Procedures

Figure 3:
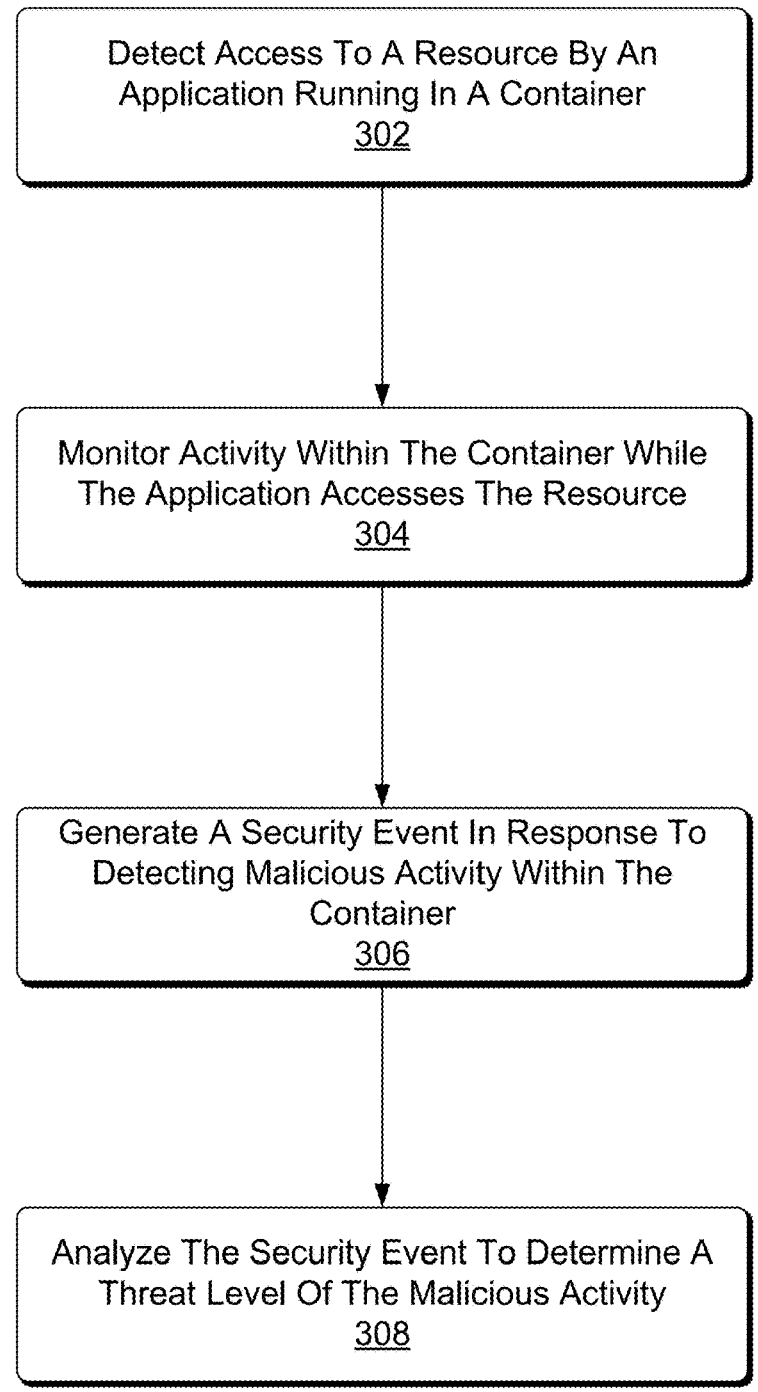
FIG. 3 is a flowchart illustrating an example process for implementing isolated container event monitoring in accordance with one or more embodiments.

FIG. 3 is a flowchart illustrating an example process 300 for implementing isolated container event monitoring in accordance with one or more embodiments. Process 300 is carried out by a system, such as system 100 of FIG. 1, and can be implemented in software, firmware, hardware, or combinations thereof. Process 300 is shown as a set of acts and is not limited to the order shown for performing the operations of various acts. Process 300 is an example process for implementing isolated container event monitoring; additional discussions of implementing isolated container event monitoring are included herein with reference to different figures.

In process 300, access to a resource by an application running in a container is detected (act 302). Access is detected when a user, administrator, program, application, or other entity of the system requests one or more resources. The one or more resources accessed by an application running in a container can include network resources from one or more locations that are located remotely from the system and/or resources that are locally hosted by the system. For example, access to a resource is detected when a user of the system navigates to a webpage using a web application running in a container or when a user of the system uses an application running in a container to open a file stored in local memory of the system.

In response to detecting access to a resource by the application running in the container, process 300 monitors activity in the container while the application accesses the resource (act 304). Alternatively or additionally, process 300 monitors activity in the container upon creation of the container and continues monitoring activity in the container until termination of the container. In one or more embodiments, the monitoring is performed by a container event manager, such as container event manager 126 of FIG. 1. The container event manager may be implemented in the same container as the application or may be implemented in a container that is separate from the container running the application. In instances where the container event manager is implemented in a container that is separate from the container running the application, the separate containers are communicatively coupled in order to facilitate inter-container activity, such as via VMBUS 208 of FIG. 2.

In response to detecting malicious activity within the container, process 300 generates a security event (act 306). In order to protect the system running the container, it is assumed that all activity occurring within a container is malicious activity. Accordingly, in one or more embodiments security events are constantly generated while the virtual application accesses the resource. Thus, the security events provide real-time information describing container activity that can be analyzed in order to determine a threat level of the container activity. In accordance with one or more embodiments, the security events are generated by a container event manager, such as container event manager 126 of FIG. 1. Alternatively or additionally, the security events are generated by a host operating system, such as host operating system 102 of FIG. 1. The container event manager may be implemented in the same container as the application or may be implemented in a container that is separate from the container running the application. Similarly, the container event manager may be implemented at a computing device that is remote from the computing device implementing the container.

Upon receiving a security event, process 300 analyzes the security event to determine a threat level of the malicious activity (act 308). The analysis can be performed at a computing device implementing the container or can be performed at a computing device that is remote from the computing device implementing the container. In accordance with one or more embodiments, analyzing the security event is performed by a security event collector, such as security event collector 116 of FIG. 1. The security event collector is configured to analyze the security event to determine a threat level of the malicious activity by comparing the security event to policy specifying acceptable container activity. Alternatively or additionally, the security event collector is configured to analyze multiple security events in order to determine a threat level of the malicious activity. For example, the security event collector can perform a new analysis for an aggregated group of security events each time a new security event is received. Alternatively, the security event collector can perform a periodic analysis for a group of aggregated security events at intervals based on a number of received security events, timer-based intervals, intervals based on power consumption metrics, and so forth.

Having considered an example procedure for implementing isolated container event monitoring at a host operating system to protect a device implementing the host operating system from attacks or infections associated with malicious network resources, consider now an example procedure that can be utilized to manage a container based on event monitoring in accordance with one or more embodiments.

Figure 4:
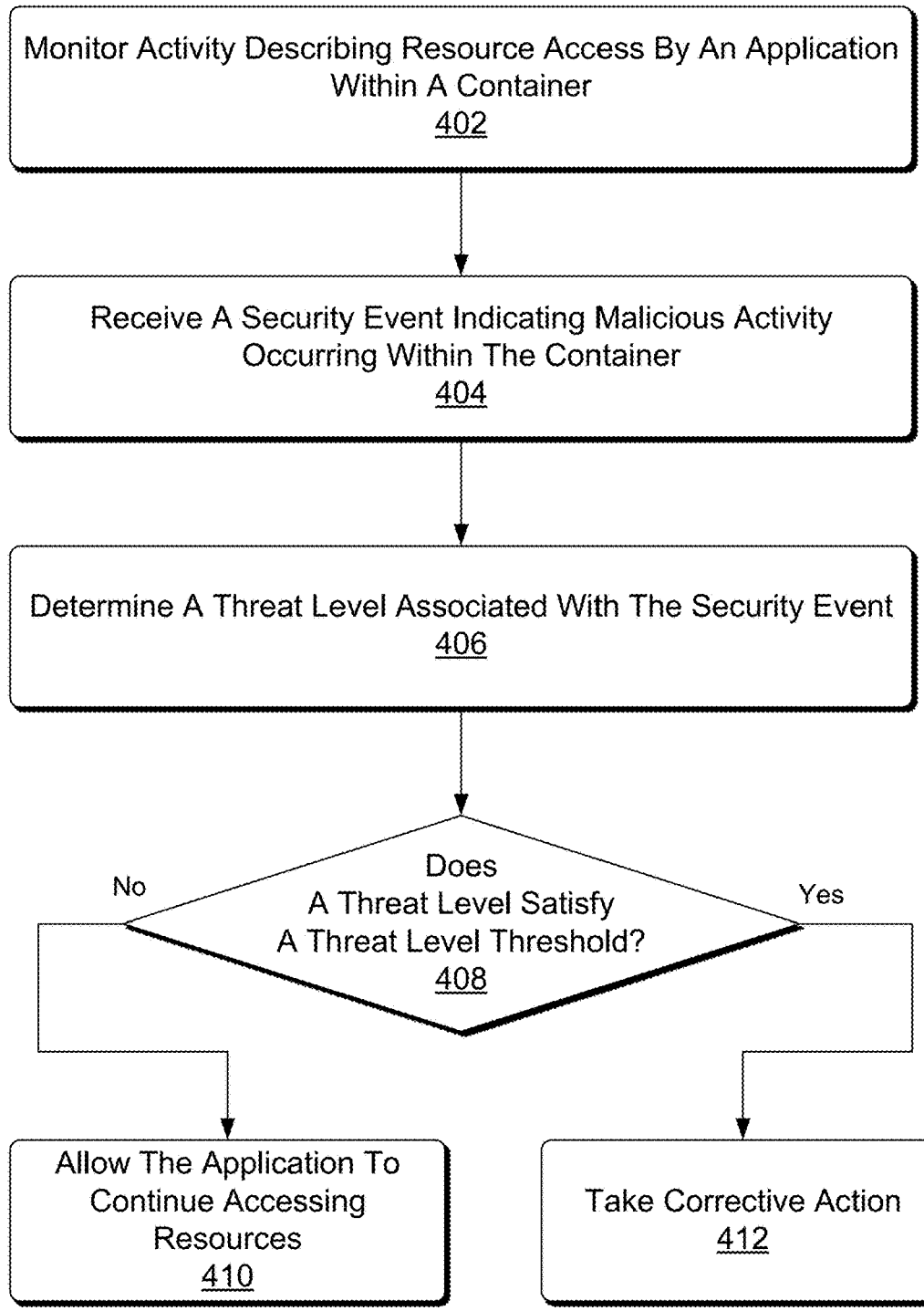
FIG. 4 is a flowchart illustrating an example process for managing a container based on event monitoring in accordance with one or more embodiments.

FIG. 4 is a flowchart illustrating an example process 400 managing a container based on event monitoring in accordance with one or more embodiments.

Process 400 is carried out by a host operating system, such as host operating system 102 of FIG. 1, and can be implemented in software, firmware, hardware, or combinations thereof. Process 400 is shown as a set of acts and is not limited to the order shown for performing the operations of various acts. Process 400 is an example process for managing a container based on event monitoring; additional discussions of managing a container based on event monitoring are included herein with reference to different figures.

In process 400, the host operating system monitors activity describing resource access by an application within a container (act 402). From this monitoring, the host operating system receives a security event indicating that malicious activity is occurring within the container (act 404).

In response to receiving the security event, the host operating system proceeds to determine a threat level associated with the security event (act 406). As discussed herein, the host operating system is configured to determine a threat level associated with the security event by comparing information included in the security event against policy information describing acceptable container activity. Alternatively or additionally, the security event collector is configured to analyze multiple security events in order to determine a threat level associated malicious activity from aggregated security events.

This determination of a threat level associated with the security event is then used by the host operating system to determine whether the threat level satisfies a threat level threshold for the malicious activity (act 408). As discussed herein, the host operating system is configured to determine that the threat level associated with at least one security event satisfies a threat level threshold if the threat level corresponds to policy defining prohibited container activity. Additionally or alternatively, the host operating system is configured to determine that the threat level associated with at least one security event satisfies a threat level threshold if the threat level does not correspond to policy defining permitted container activity.

In response to determining that the threat level does not satisfy a threat level threshold, the host operating system allows the application to continue accessing resources (act 410). In this manner, the host operating system does not interfere with container activity that is not determined to pose a threat based on its failure to satisfy a threat level threshold.

In response to determining that the threat level satisfies a threat level threshold for the malicious activity, the host operating system takes corrective action (act 412). In accordance with one or more embodiments, taking corrective action comprises quarantining the container or the resource to prevent the host operating system from potentially malicious activity. Alternatively or additionally, taking corrective action comprises notifying at least one different computing device of the malicious activity to prevent the different computing device from the potentially malicious activity. As such, the host operating system is configured to protect both itself and other operating systems and/or computing devices from succumbing to similar malicious activity. In accordance with one or more embodiments, process 400 is implemented in a host operating system of a central computing device in an enterprise or a cloud service to protect large numbers of computing devices from malicious activity.

Having considered an example process for managing a container based on event monitoring, consider now an example procedure for monitoring events in isolated containers in accordance with one or more embodiments.

FIG. 5 is a flowchart illustrating an example process 500 for monitoring events in isolated containers accordance with one or more embodiments.

Process 500 is carried out by a host operating system, such as host operating system 102 of FIG. 1, and can be implemented in software, firmware, hardware, or combinations thereof. Process 500 is shown as a set of acts and is not limited to the order shown for performing the operations of various acts. Process 500 is an example process for monitoring events in isolated containers; additional discussions of monitoring events in isolated containers are included herein with reference to different figures.

In process 500, the host operating system runs an application in a container that is isolated from the host operating system (act 502). By running the application in the container, the host operating system isolates itself from any potential malicious activity that occurs within the container. While the application is running in the container, the host operating system monitors container activity (act 504). As described herein, container activity refers to any process or operation that occurs from the running of the application. For example, container activity can include access to a container file system cache, access to a container registry, access to a kernel of the container, access to container memory, running another process in the container, accessing resources, and so on.

From the monitored container activity, the host operating system detects access by the application to a resource (act 506). As described herein, access by the application to a resource can include access to a network resource that is stored remote from a computing device implementing the host operating system or access to a resource stored locally at a computing device implementing the host operating system.

In response to detecting access by the application to a resource, a security event describing malicious activity occurring from the application's access to the resource is generated (act 508). In accordance with one or more embodiments, the host operating system treats all container activity as malicious activity, thus security events are constantly generated for all activity occurring from the application's access to a resource. In accordance with one or more implementations, the security event is generated by a container event manager running in the container with the application. Alternatively, the security event may be generated by a container event manager running in a different container than the container running the application. This enables consistent generation of security events in real-time that describe all activity resulting from the application accessing a resource.

The generated security event is then logged (act 510). In accordance with one or more embodiments, the host operating system logs the security event in a security event collector implemented locally on the host operating system. Alternatively or additionally, the host operating system is configured to log the security event at a location implemented remotely from the host operating system, such as in another isolated container, in a cloud service, in a device located remotely from a device implementing the host operating system, and so on. By logging the security event, the host operating system is configured to generate or supplement a repository of information describing container activity. This information can then be used by one or more devices to protect software and hardware from compromise by otherwise unrecognizable malicious activity.

After logging the security event, the logged security event is analyzed to determine a threat level of the malicious activity (act 512). Analyzing the logged security event can be performed by any suitable device, such as by a device storing the logged security event, a device implemented remotely from a storage location of the logged security event, a container isolated from the container running the application, a cloud service, and so on. In accordance with one or more embodiments, the analysis of a logged security event can be performed by comparing the logged security event to other similar logged security events to determine whether the security event corresponds to operations outside a range of expected behavior for the application. Thus, with the addition of more logged security events, analysis can be improved to more accurately determine a threat level of malicious activity occurring within the container. Additionally, logged security events can be analyzed to learn malicious patterns over time. Patterns of logged security events can be analyzed to identify certain patterns that repeatedly generate a threat level that satisfies a given threat level threshold. For example if a pattern of security events describing an application's access to a specific website results in satisfying a threat level threshold, it can be learned that the specific website is not to be trusted.

In response to determining that the threat level of the malicious activity satisfies a threat level threshold, corrective action is taken to mitigate the malicious activity (act 514). In accordance with one or more embodiments, taking corrective action comprises quarantining the container or the resource to prevent the host operating system from potentially malicious activity. Alternatively or additionally, taking corrective action comprises notifying at least one different computing device of the malicious activity to prevent the different computing device from the potentially malicious activity. As such, the host operating system is configured to protect both itself and other operating systems and/or computing devices from succumbing to similar malicious activity. In accordance with one or more embodiments, process 500 is implemented in a host operating system of a central computing device in an enterprise or a cloud service to protect large numbers of computing devices from malicious activity.

Example System

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
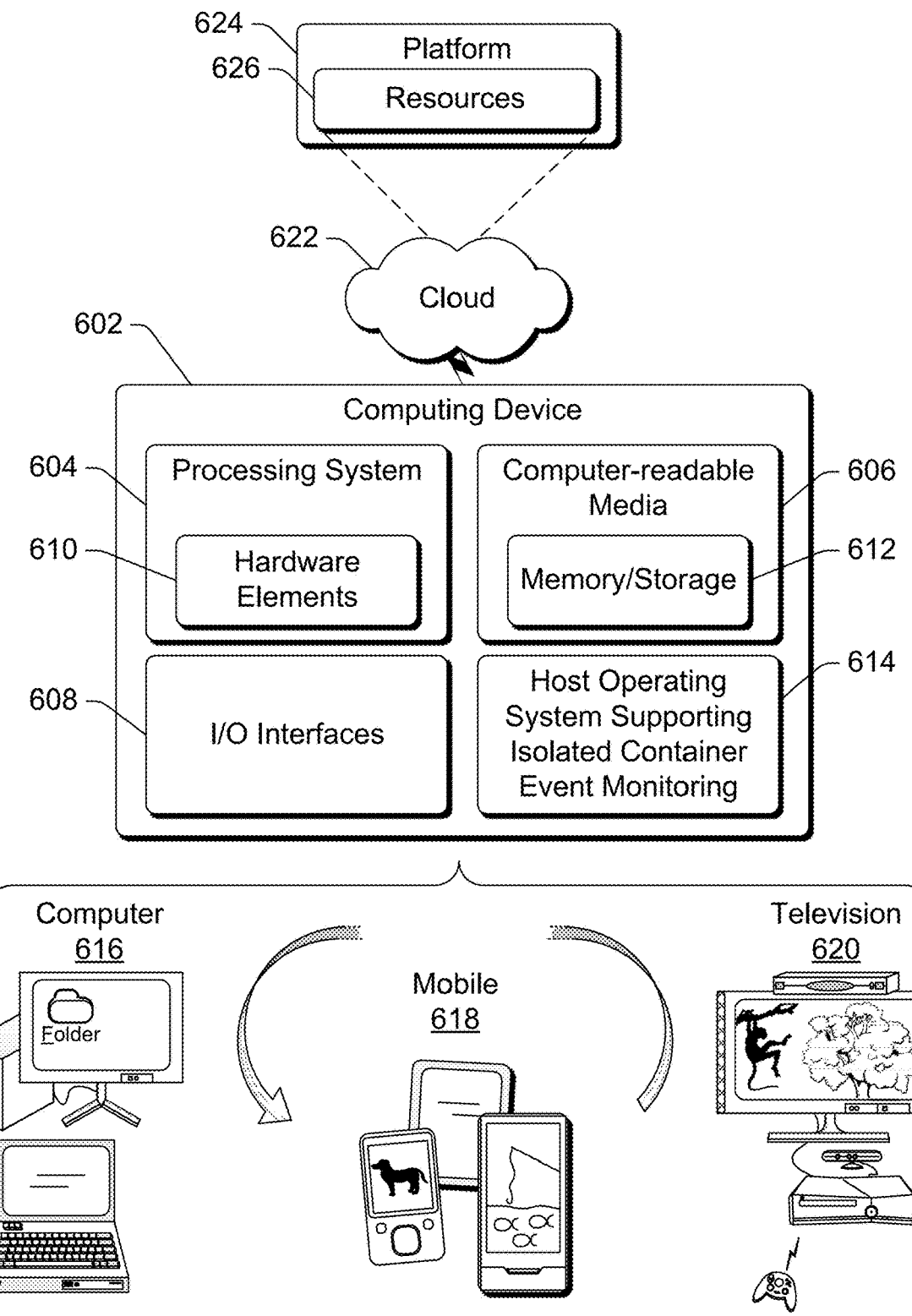
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), a sensor (e.g. an ambient light sensor or a motion sensor), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a host operating system supporting isolated container event monitoring 614. The host operating system supporting isolated container event monitoring 614 provides various management of event monitoring for isolated containers, as discussed above. The host operating system supporting isolated container event monitoring 614 can implement, for example, the host operating system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622. It should be noted that the cloud 622 can be arranged in a myriad of configurations. For example, the cloud 622 can be implemented as a single cloud, as multiple instances of cloud 622 all behaving as a single cloud, or with one or more instances of platform 624 implemented behind the cloud 622 and behaving as if the one or more instances of platform 624 were implemented in the cloud.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: detecting an access to a resource by an application running in a container that is isolated from a host operating system; monitoring application activity in the container while the application is accessing the resource; responsive to detecting potentially malicious activity in the container, generating a security event that includes information describing the potentially malicious activity; and analyzing the security event to determine a threat level associated with the potentially malicious activity.

Alternatively or in addition to any of the above described methods, any one or combination of: the method further comprising transmitting the generated security event to a computing device that is remote from a host computing device implementing the container; wherein the host computing device is a computing device within an enterprise of computing devices and the remote computing device is a central server for the enterprise of computing devices; wherein the potentially malicious activity comprises an unauthorized change made to a registry of the container, an unauthorized change made to a configuration file for the container, an unauthorized change made to a file system of a computing device implementing the container, or an unauthorized initiation of an application process within the container; wherein the security event is generated by a container event manager running in the container and the host operating system is configured to generate a separate security event that describes the potentially malicious activity and compare the security event with the separate security event to determine whether the container event manager is functioning correctly; the method further comprising generating multiple security events that include information describing application activity in the container while the application accesses the resource and analyzing the multiple security events together to determine a threat level associated with the application activity in the container while the application accesses the resource; wherein the potentially malicious activity comprises an unauthorized attempt to access memory of a computing device implementing the container; wherein the potentially malicious activity comprises an unauthorized kernel activity in the container or a computing device implementing the container; wherein the potentially malicious activity comprises network activity within the container that is outside a range of normal network activity for the application running in the container; wherein the resource is a network resource or a shared resource hosted by a device implementing the container; the method further comprising preventing the application from accessing the resource in response to determining that a threat level associated with the potentially malicious activity satisfies a threat level threshold; wherein the application comprises an operating system or a web browser.

A method comprising: receiving a security event that includes information describing potentially malicious activity resulting from an application accessing a resource in a container that is isolated from a host operating system; determining that a threat level associated with the received security event satisfies a threat level threshold; and; responsive to determining that the threat level associated with the received security event satisfies the threat level threshold, taking corrective action to mitigate the potentially malicious activity in the container.

Alternatively or in addition to any of the above described methods, any one or combination of: wherein the received security event is received as a pattern of security events and determining that the threat level associated with the received security event satisfies the threat level threshold comprises comparing the pattern of security events against policy describing malicious patterns of security events; wherein taking corrective action comprises quarantining the container to prevent access to any resources or data stores that are implemented outside the container; wherein taking corrective action comprises adding the resource to a blacklist and sending the blacklist to at least one computing device to protect the at least one computing device from the potentially malicious activity; wherein taking corrective action comprises quarantining the resource so that the application is prevented from further accessing the resource; wherein taking corrective action comprises terminating the container, generating a second container that is isolated from the host operating system, and running a second instance of the application in the second container; wherein taking corrective action comprises generating a snapshot of the container that describes a current state of the application and the resource in the container, prior to terminating the container.

A device comprising: one or more processors; and one or more computer-readable storage media storing computer-readable instructions that are executable by the one or more processors to perform operations comprising: detecting an access to a resource by an application running in a container that is isolated from a host operating system; monitoring activity in the container while the application is accessing the resource; responsive to detecting potentially malicious activity in the container, generating a security event that includes information describing the potentially malicious activity; analyzing the security event to determine a threat level associated with the potentially malicious activity; determining that the threat level associated with the generated security event satisfies a threat level threshold; and responsive to determining that the threat level associated with the received security threat satisfies the threat level threshold, taking corrective action to mitigate the potentially malicious activity in the container.

Alternatively or in addition to any of the above described computing devices, any one or combination of: the operations further comprising transmitting the generated security event to a computing device that is remote from the device implementing the container; wherein the device is a computing device within an enterprise of computing devices and the remote computing device is a central server for the enterprise of computing devices; wherein the potentially malicious activity comprises an unauthorized change made to a registry of the container, an unauthorized change made to a configuration file for the container, an unauthorized change made to a file system of the device implementing the container, or an unauthorized initiation of an application process within the container; wherein the security event is generated by a container event manager running in the container and the host operating system is configured to generate a separate security event that describes the potentially malicious activity and compare the security event with the separate security event to determine whether the container event manager is functioning correctly; the operations further comprising generating multiple security events that include information describing application activity in the container while the application accesses the resource and analyzing the multiple security events together to determine a threat level associated with the application activity in the container while the application accesses the resource; wherein the potentially malicious activity comprises an unauthorized attempt to access memory of the device implementing the container; wherein the potentially malicious activity comprises an unauthorized kernel activity in the container or the device implementing the container; wherein the potentially malicious activity comprises network activity within the container that is outside a range of normal network activity for the application running in the container; wherein the resource is a network resource or a shared resource hosted by the device implementing the container; wherein the application comprises an operating system or a web browser.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a threat level of a potentially malicious activity by an application running in a container isolated from a host operating system, the method comprising:

performing by a container event manager running in the container:
   detecting an access to a resource by the application;
   detecting the potentially malicious activity by monitoring application activity in the container while the application is accessing the resource;
   responsive to detecting the potentially malicious activity in the container, generating a security event that includes information describing the potentially malicious activity; and
   communicating the security event to the host operating system via a secure communication channel; and performing by the host operating system:
   analyzing the security event to determine the threat level associated with the potentially malicious activity;
   generating a separate security event that describes the potentially malicious activity; and
   comparing the security event with the separate security event to determine whether the container event manager is functioning correctly.

2. The method as recited in claim 1, further comprising transmitting the security event to a remote computing device that is remote from a host computing device implementing the container.

3. The method as recited in claim 2, wherein the host computing device is a computing device within an enterprise of computing devices and the remote computing device is a central server for the enterprise of computing devices.

4. The method as recited in claim 1, wherein the potentially malicious activity comprises an unauthorized change made to a registry of the container, an unauthorized change made to a configuration file for the container, an unauthorized change made to a file system of a computing device implementing the container, or an unauthorized initiation of an application process within the container.

5. The method as recited in claim 1, further comprising generating multiple security events that include information describing multiple application activities in the container while the application accesses one or more resources and analyzing the multiple security events together to determine a threat level associated with the multiple application activities.

6. The method as recited in claim 1, wherein the potentially malicious activity comprises an unauthorized attempt to access memory of a computing device implementing the container.

7. The method as recited in claim 1, wherein the potentially malicious activity comprises an unauthorized kernel activity in the container or in the host operating system implementing the container.

8. The method as recited in claim 1, wherein the potentially malicious activity comprises network activity within the container that is outside a range of normal network activity for the application running in the container.

9. The method as recited in claim 1, wherein the resource is a network resource or a shared resource hosted by a device implementing the container.

10. The method as recited in claim 1, further comprising preventing the application from accessing the resource in response to determining that the threat level associated with the potentially malicious activity satisfies a threat level threshold.

11. The method as recited in claim 1, wherein the application comprises an operating system or a web browser.

12. A method in a host operating system comprising:
receiving via a secure communication channel a security event that includes information describing potentially malicious activity detected by a container event manager running in a container that is isolated from the host operating system and resulting from an application running in the container accessing a resource in the container;
determining whether a threat level associated with the security event satisfies a threat level threshold and if so, taking corrective action to mitigate the potentially malicious activity in the container;
generating a separate security event that describes the potentially malicious activity; and
comparing the security event with the separate security event to determine whether the container event manager is functioning correctly.

13. The method as recited in claim 12, wherein the security event is received as a pattern of security events and determining that the threat level associated with the received security event satisfies the threat level threshold comprises comparing the pattern of security events against policy describing malicious patterns of security events.

14. The method as recited in claim 12, wherein taking corrective action comprises quarantining the container to prevent access to any resources or data stores that are implemented outside the container.

15. The method as recited in claim 12, wherein taking corrective action comprises adding the resource to a blacklist and sending the blacklist to at least one computing device to protect the at least one computing device from the potentially malicious activity.

16. The method as recited in claim 12, wherein taking corrective action comprises quarantining the resource so that the application is prevented from further accessing the resource.

17. The method as recited in claim 12, wherein taking corrective action comprises terminating the container, generating a second container that is isolated from the host operating system, and running a second instance of the application in the second container.

18. The method as recited in claim 17, wherein taking corrective action comprises generating a snapshot of the container that describes a current state of the application and the resource in the container, prior to terminating the container.

19. The method of claim 12 wherein the potentially malicious activity comprises an unauthorized attempt to access memory of a computing device implementing the container.

20. A computer-readable memory device having program code recorded thereon that when executed by at least one processor of a computing device causes the at least one processor to perform operations for determining a threat level of potentially malicious activity by an application running in a container isolated from a host operating system, the operations comprising:
generating by a container event manager running in the container a security event that includes information describing the potentially malicious activity, said generating comprising:
detecting an access to a resource by the application;
monitoring application activity in the container while the application is accessing the resource to detect the potentially malicious activity; and
responsive to detecting the potentially malicious activity in the container, generating the security event;
communicating the security event to the host operating system via a secure communication channel; and
performing by the host operating system:
analyzing by the host operating system the security event to determine a threat level associated with the potentially malicious activity;
generating a separate security event that describes the potentially malicious activity; and
comparing the security event with the separate security event to determine whether the container event manager is functioning correctly.

* * * * *